April 15, 1969    H. SEDLACEK    3,438,076
STRUCTURAL ELEMENTS FOR DISMOUNTABLE BRIDGES OR THE LIKE
Filed March 21, 1967    Sheet 4 of 12

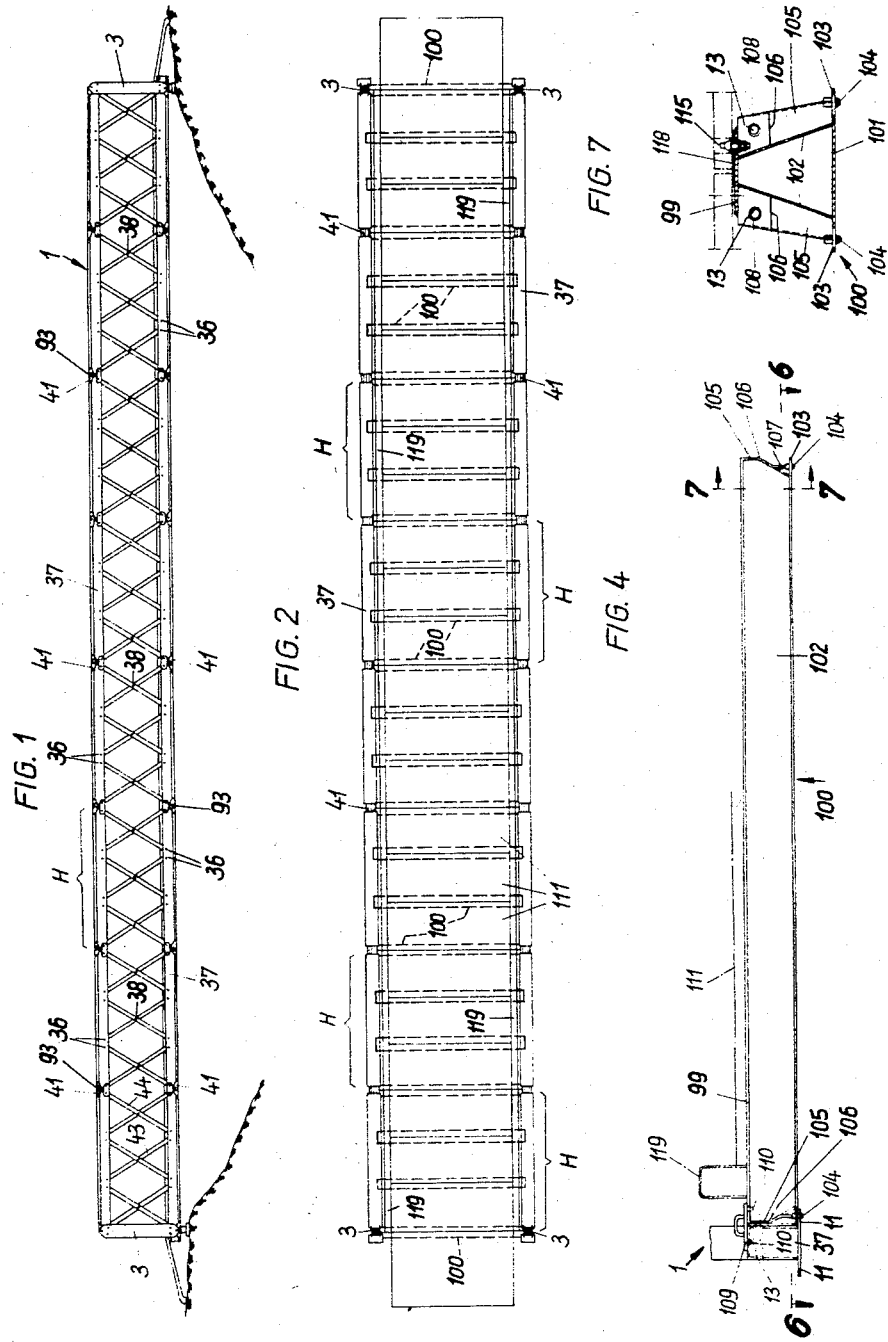

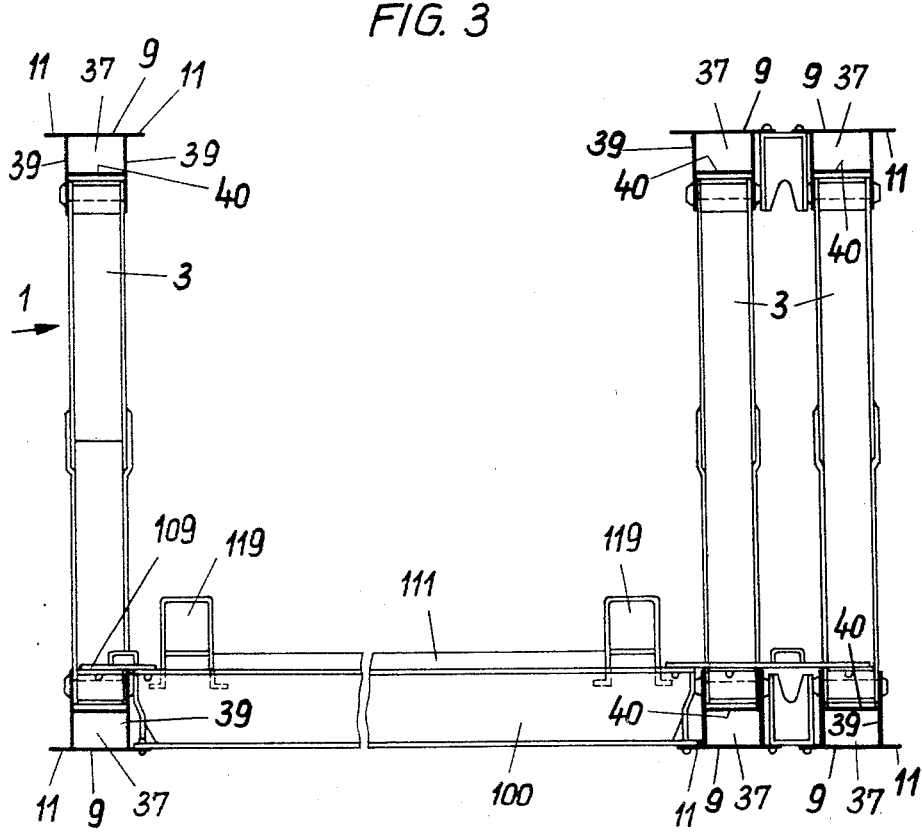

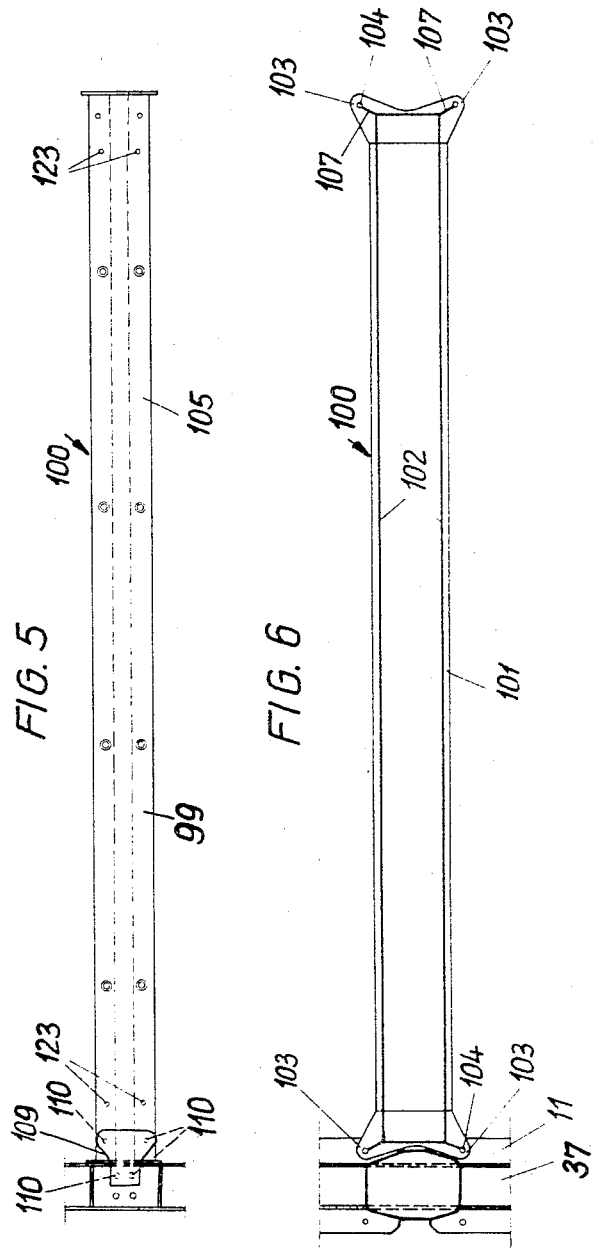

Inventor:
Hugo Sedlacek
BY Spencer & Kaye
Attorneys

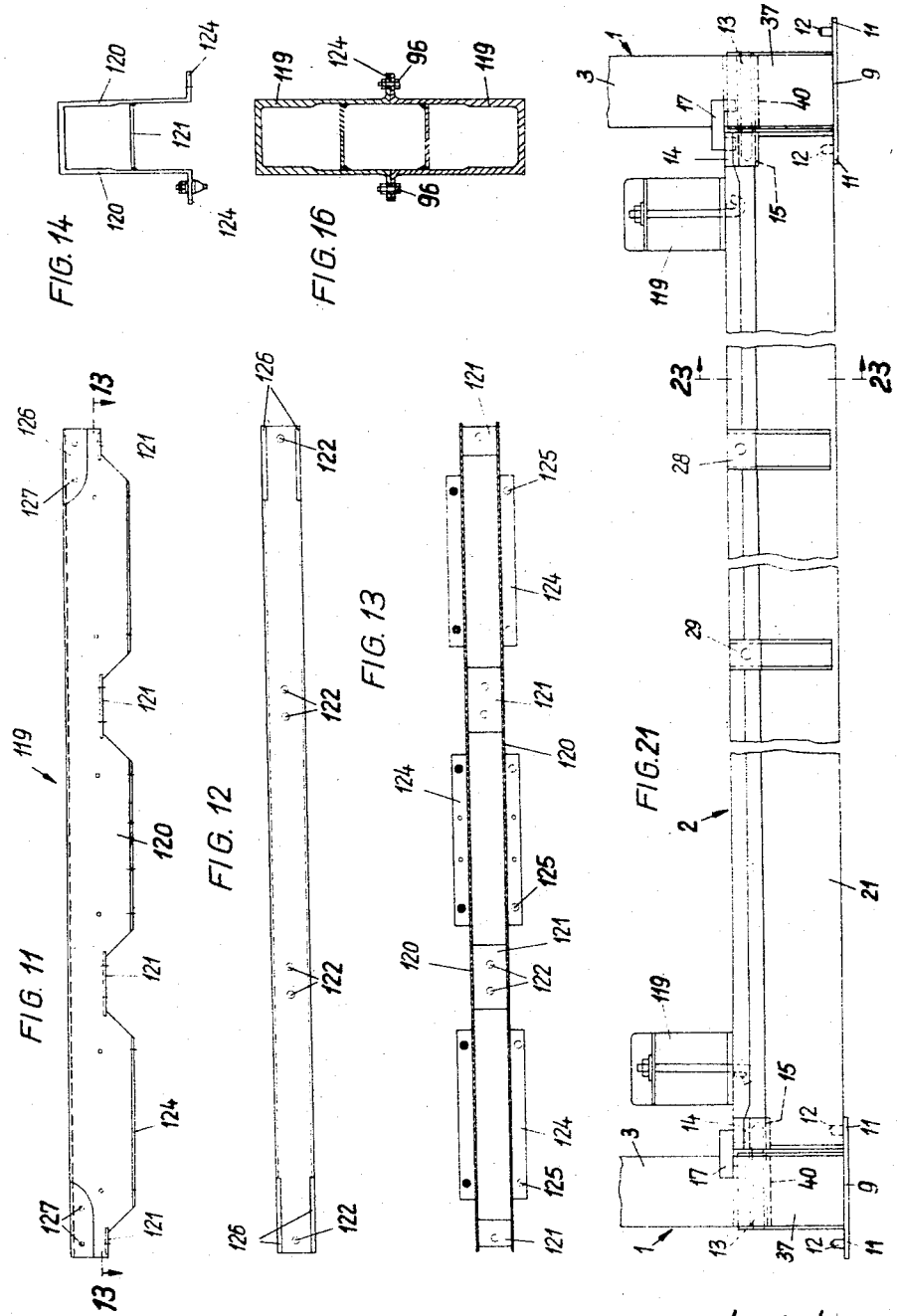

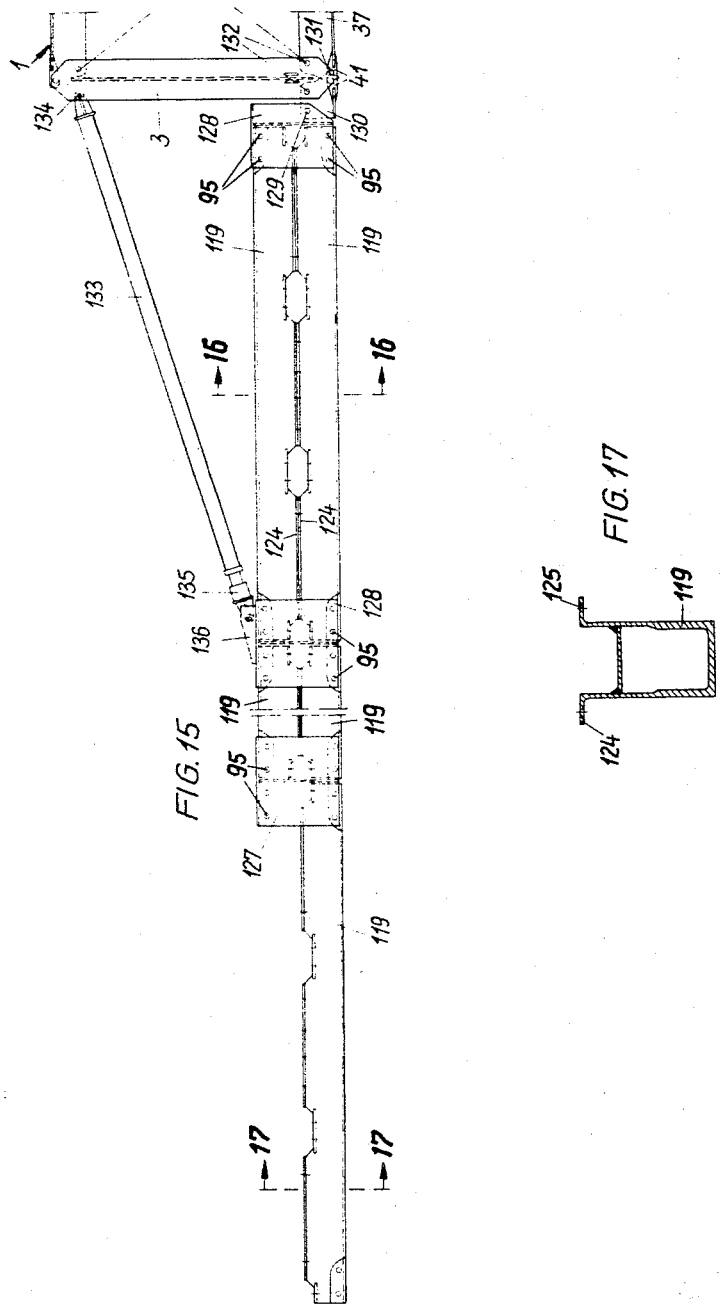

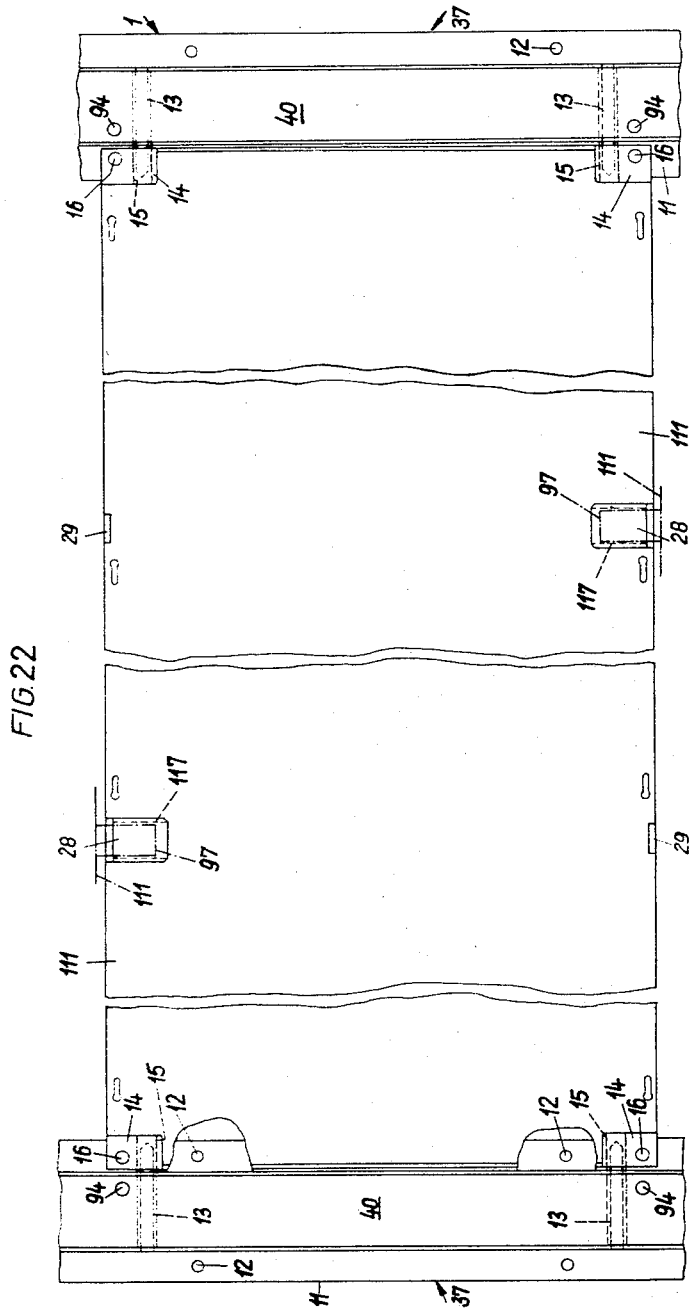

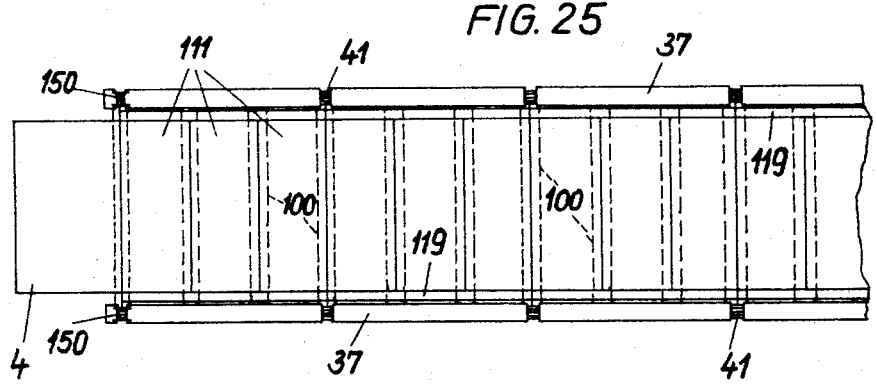
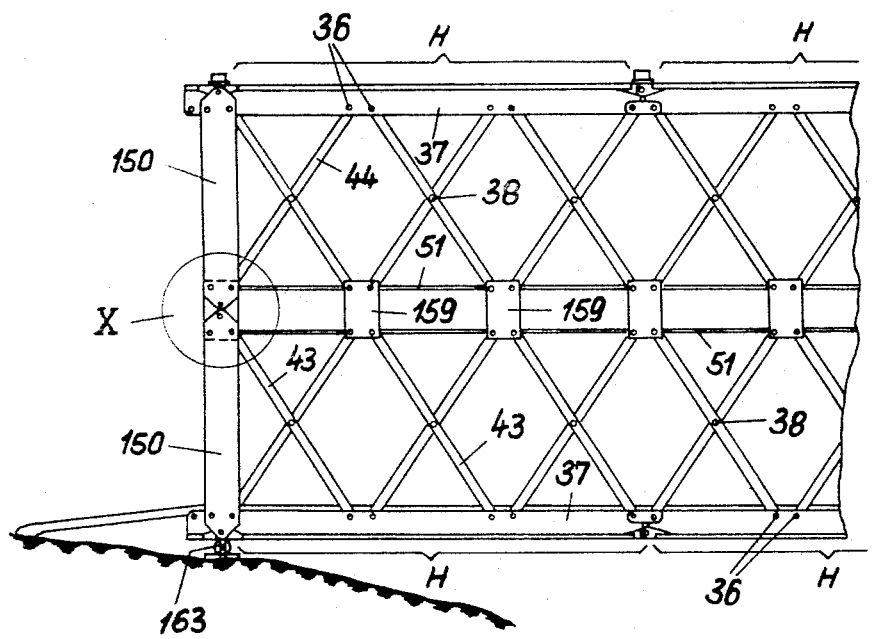

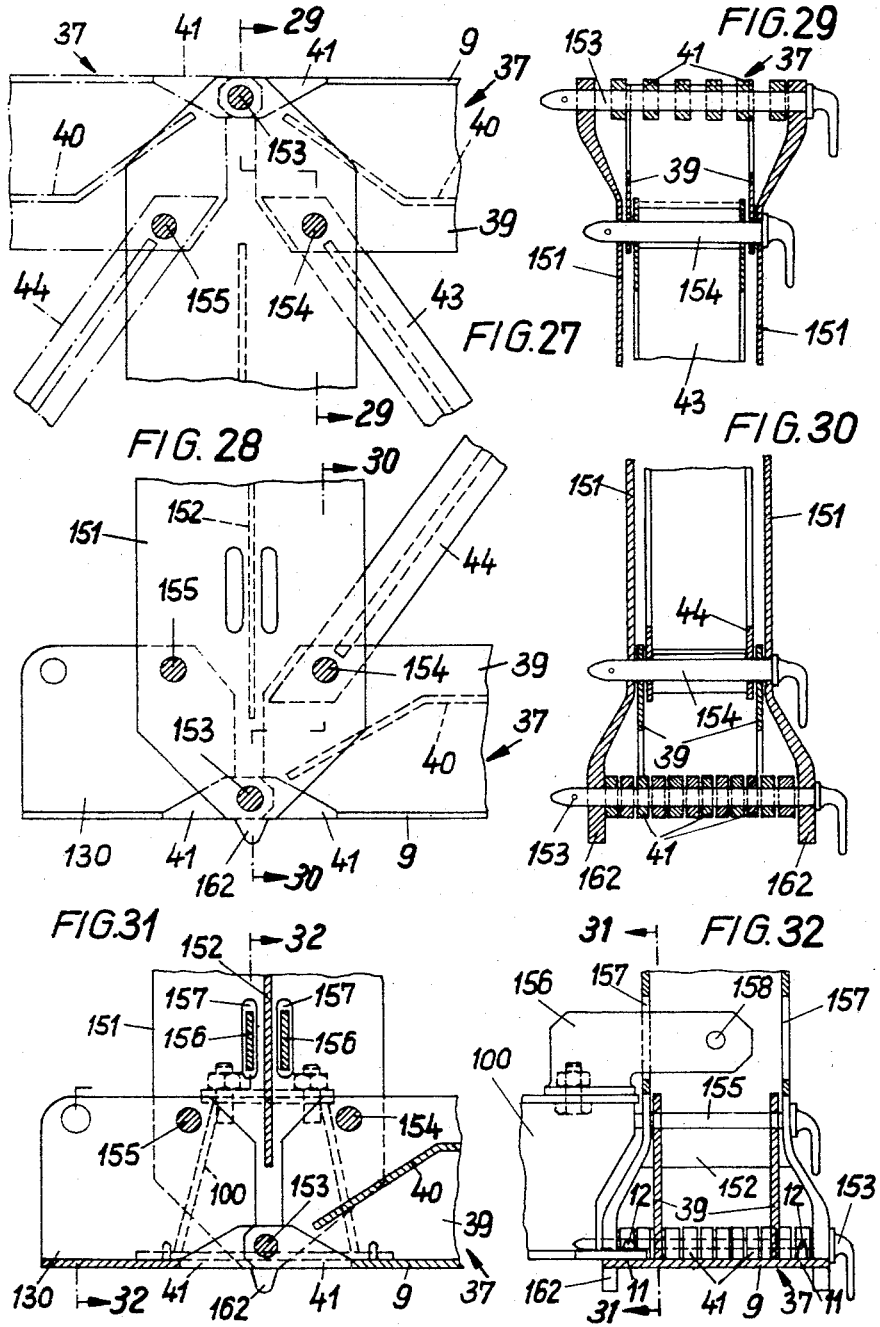

FIG. 33
FIG. 34
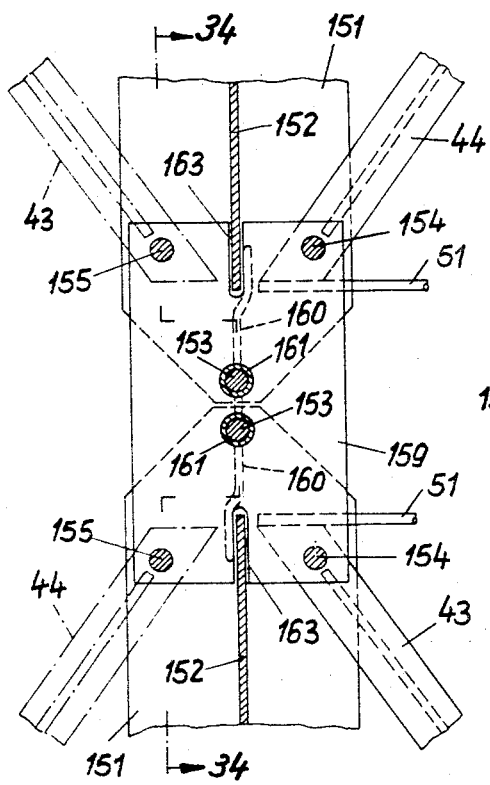
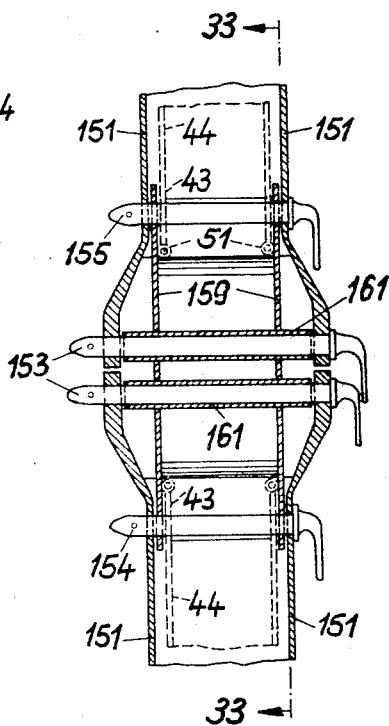

United States Patent Office 3,438,076
Patented Apr. 15, 1969

3,438,076
STRUCTURAL ELEMENTS FOR DISMOUNTABLE
BRIDGES OR THE LIKE
Hugo Sedlacek, Rheinhausen, Germany, assignor to
Beteiligungs- und Patentverwaltungsgesellschaft mit
beschrankter Haftung, Essen, Germany
Filed Mar. 21, 1967, Ser. No. 624,854
Claims priority, application Germany, Apr. 2, 1966,
B 86,504; May 11, 1966, B 87,068; July 14, 1966,
B 87,992
Int. Cl. E01d 15/12, 19/00
U.S. Cl. 14—1.4                                       23 Claims

ABSTRACT OF THE DISCLOSURE

A dismountable bridge is fabricated from a combination of detachably connected structural elements which can be easily transported and quickly assembled to form a variety of different bridges. In its assembled form, the bridge contains at least two main girders, each of which has upper and lower chord members, with ledges projecting from the lower chord members of both main girders. A plurality of roadway supporting elements extend between the lower chord members of the main girders and rest on the ledges projecting therefrom. The roadway supporting elements are detachably connected to the lower chord members.

The main girders are each made from a plurality of identical main girder sections which are coupled together at the ends of their chord members by means of multisectional hinges attached thereto. The multisectional hinges are connected together by means of connecting pins which are positioned at right angles to the main girders, thereby distributing the bending moments of the bridge structure across several of the main girder sections.

Background of the invention

This invention relates to the construction of dismountable bridges or the like and has as its object to provide a combination of simple, interrelated structural elements which can be easily transported and quickly assembled to form a variety of different dismountable bridges which are particularly simple and sturdy in construction and which can be quickly disassembled.

Summary of the invention

In its assembled form, the dismountable bridge structure of this invention includes at least two main girders each containing upper and lower chord members, the lower chord members of both main girders having ledges projecting therefrom, with a plurality of roadway supporting elements extending between the lower chord members and resting on the ledges projecting therefrom, the roadway supporting elements being detachably connected to the lower chord members. The main girders preferably comprise a plurality of identical main girder sections which are coupled to one another at the ends of their chord sections by means of multisectional hinges having connecting pins positioned at right angles to the main girders. In this coupling, the hinges distribute the bending moments resulting from the weight of the structural elements and from traffic loads in a span length extending across several main girder sections.

For example, in one embodiment of the invention, the roadway support elements are formed by box-shaped cross beams which are resistant to bending and torsional stresses; these cross beams serving to support the roadway plates, and their lower terminal plate being provided with flanges at the corners for resting on the ledges projecting from the lower chords of the main girders and for receiving connecting elements. Each cross beam has a trapezoidal cross section, tapering toward the top, and is provided with an upper terminal plate projecting on both sides at right angles. The cross beams can be covered with a layer of rubber or the like on their upper surface as a padding for the roadway plates. On the cross beams, box-shaped protective curb plates are provided, preferably on both sides of the roadway plates. The side walls of these curb plates extend below the cross beams and are angled outwardly at their lower edges to form flanges. Two of such protective curb plates can be rigidly connected with each other by placing their cross sections upon each other in mirror-image relation and connecting the flanges thereof together to form a projecting lug to assist in rolling the main girder sections during assembly of the bridge.

It is also possible to construct the roadway support elements from roadway plates which are resistant to bending and torsional stresses. In one embodiment, such roadway plates comprise one upper and one lower cover plate with a truss structure positioned therebetween. Hollow ribs are connected to the underside of the lower cover plate, which hollow ribs extend in the direction of the truss structure and are provided with trapezoidal cross sections flaring toward the top; the height of the hollow ribs being about twice to three times the distance between cover plates. Such plates, which have a low inherent weight, can carry large loads. Thus, for the same load capacity, this support unit is lighter than conventional support units. In order to connect the plates with the main girders in a simple manner, the plates are provided with recesses which are engaged from above by brackets secured in recesses in the main girders. Together with lugs which project upwardly from the ledges of the lower chords and engage recesses in the plates, these brackets prevent an oblique displacement of the main girders with respect to the plates. Crossbars prevent the plates from lifting off the projections of the main girders.

In a dismountable bridge according to the invention, the terminal columns consist of two lateral plates extending in the longitudinal direction of the bridge with a web plate connecting these two lateral plates. The lateral plates can be spread at their upper and lower ends to receive the multisectional hinges of the main girder upper and lower chord sections. For connecting each terminal pillar with an upper and a lower chord section, there is provided one connecting bolt passing through each of the multisectional hinges and a further connecting bolt passing through bores in the portions of the lateral plates of the terminal pillar which are not spread and through matching bores in the lateral walls of the chord sections encompassed by these lateral plates.

Brief description of the drawings

FIGURE 1 is a side view of one illustrative dismountable truss bridge of this invention.

FIGURE 2 is a top plan view of the bridge shown in FIGURE 1.

FIGURE 3 is a vertical cross-sectional view of a truss bridge such as shown in FIGURES 1 and 2, with the left-hand portion of the figure showing a single wall main girder and the right-hand portion of the figure showing a double wall main girder.

FIGURE 4 is a side view of a cross beam.

FIGURE 5 is a top plan view of the cross beam shown in FIGURE 4.

FIGURE 6 is a horizontal cross-sectional view taken substantially along the plane defined by reference line 6—6 of FIGURE 4.

FIGURE 7 is a vertical cross-sectional view taken substantially along the plane defined by reference line 7—7 of FIGURE 4.

FIGURE 11 is a side view of a protective curb plate.

FIGURE 12 is a top plan view of the curb plate shown in FIGURE 11.

FIGURE 13 is a horizontal cross-sectional view taken substantially along the plane defined by the reference line 13—13 of FIGURE 11.

FIGURE 14 is a front view of the curb plate shown in FIGURE 11.

FIGURE 15 is a side view of a projecting lug attached to a bridge supporting element.

FIGURE 16 is a vertical cross-sectional view taken substantially along the plane defined by reference line 16—16 of FIGURE 15.

FIGURE 17 is a vertical cross-sectional view taken substantially along the plane defined by reference line 17—17 of FIGURE 15.

FIGURE 21 is a side view of another dismountable bridge of this invention.

FIGURE 22 is a top plan view of the bridge shown in FIGURE 21.

FIGURE 25 is a top plan view of the bridge shown in FIGURE 24.

FIGURE 26 is a side view of a portion of a two-story dismountable bridge of this invention.

FIGURE 27 is a side view of the top end of a terminal pillar for the bridge shown in FIGURE 24.

FIGURE 28 is a side view of the bottom end of a terminal pillar for the bridge shown in FIGURE 24.

FIGURE 29 is a vertical cross-sectional view taken substantially along the plane defined by reference line 29—29 of FIGURE 27.

FIGURE 30 is a vertical cross-sectional view taken substantially along the plane defined by reference line 30—30 of FIGURE 28.

FIGURE 31 is a vertical cross-sectional view of the pillar shown in FIGURE 28 taken along the inner side wall of one of the adjacent chord sections as indicated by the reference line 31-31 in FIGURE 32.

FIGURE 32 is a vertical cross-sectional view taken substantially along the plane defined by reference line 32—32 in FIGURE 31.

FIGURE 33 is a side view of the detail indicated by X in FIGURE 26 taken substantially along the plane indicated by reference line 33—33 in FIGURE 34.

FIGURE 34 is a vertical cross-sectional view taken substantially along the plane defined by reference line 34—34 of FIGURE 33.

*Description of the preferred embodiments*

Figure 8:
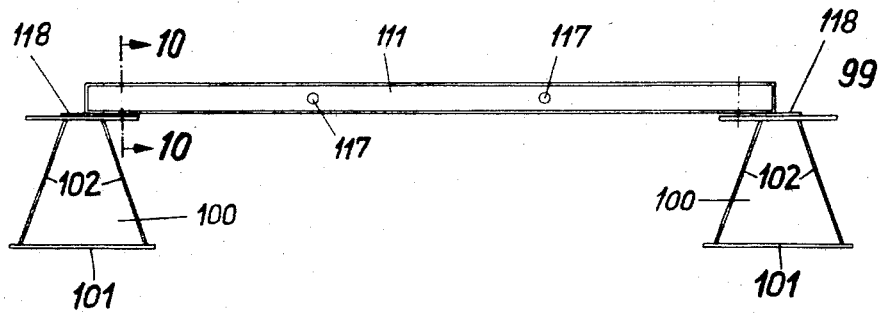
FIGURE 8 is a vertical cross-sectional view of two cross beams with a lateral view of a roadway plate extending therebetween.

The bridge according to FIGURES 1 to 3 comprises two trussed main girders 1, each containing a plurality of identical main girder sections H. Main girders 1 are supported at their ends by posts 3 attached thereto. The lower chords and the upper chords of the main girders 1 contain a plurality of identical chord sections 37 which are interchangeable. These chord sections are made from beams having a rectangular cross section. The terminal plate 9 of each rectangular beam 37, which plate is positioned at the bottom in the lower chord and at the top in the upper chord, projects beyond the side walls 39 on both sides, so that projecting ledges 11 are formed. The side walls 39 project with respect to the other terminal plate 40, which is positioned at the top in the lower chord and at the bottom in the upper chord. Terminal plate 40 is angled at the ends of chord section 37 toward terminal plate 9, as best shown in FIGURES 27, 28 and 31.

At the ends of each chord section 37, multisectional hinge halves 41 are provided in an identical arrangement, so that adjacent chord sections 37 can be coupled with each other with any of their ends in an aligned position with respect to each other by means of matching hinge halves 41 (see also FIGURES 27–32). The hinge halves 41 are connected together by bolts 93 passed through bores therein. (In FIGURES 27–32, the bolt through hinge halves 41 is indicated by the reference numeral 153.) The main girder sections H are rigidly connected with one another by the above-described hinge-type coupling of the chord sections 37 in the upper and lower chords. The hinge halves 41 likewise serve for coupling the main girder sections H located at the ends of the bridge to the post 3.

Each main girder section has three pairs of truss members 43, 44 crossing each other. These truss members extend with their ends between the lateral walls 39 of the chord sections 37 and are fastened thereto by means of bolts 36. Each pair of truss members 43, 44 is fixedly connected with each other at their points of crossing by means of bolts 38.

The two main girders 1 are connected with each other in the manner of a frame by means of cross beams 100, so that a trough is formed as shown in FIGURE 3. One of the cross beams is positioned centrally with respect to the junction between two main girder sections H, and two additional cross beams 100 are arranged at equal spacings from each other as shown in FIGURE 2.

Each cross beam 100 has, as shown in FIGURES 4–7, a trapezoidal, upwardly tapering cross section. The lower terminal plate 101 projects on both sides with respect to the lower edges of the inclined lateral surfaces 102 and forms two flanges 103 at the corners of each end of the cross beam. By means of these flanges, the cross beam is seated on the ledges 11 of the chord sections 37 in the lower chords of the main girders. Downwardly extending connecting pins 104 are provided in these flanges, these pins engaging bores in the ledges 11. The upper terminal plate 99 of the cross beam 100 likewise extends on both sides beyond the inclined lateral walls 102. On both ends, the upper terminal plate is welded to end plates 105 which are engaged by the front edges of the lateral walls 102. These end plates are angled, starting at an edge 106 positioned somewhat above half the height of the cross beam 100, toward the center of the cross beam, so that recesses are formed between end plates 105 and the flanges 103, into which recesses the upper ends of the pins 104 extend. Within the recesses, the pins are reinforced by webs 107.

Bores 108 are provided above the edges 106 in the bilaterally projecting portions of the end plates 105. Bolts 13, displaceably guided in the chord sections 37 at right angles to the longitudinal direction of the bridge, extend into these bores 108. This arrangement prevents the cross beams 100 from being lifted off the ledges 11.

Moreover, the cross beams 100 are connected with the chord sections 37 by metal plates 109 resting, on one side, on the upper terminal plate 99 and, on the other side, on a plate of the chord section 37 positioned at the same level. Plates 109 engage bores in the plate 99 and the plate of the chord section 37 by means of lugs 110.

By means of the connecting pins 104, the bolts 13, and the lugs 110 projecting from plates 109, cross beams 100 are connected with the chord sections 37 and consequently with the main girder sections H in such a manner that expansion and compression forces, as well as moments, effective in any desired direction, are transferred, i.e., a frame-type, rigid connection is established between the cross beams 100 and the main girders 1.

Figure 9:
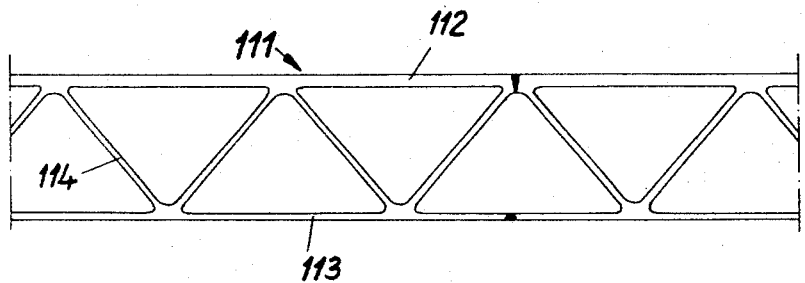
FIGURE 9 is a vertical cross-sectional view of a roadway plate.
Figure 10:
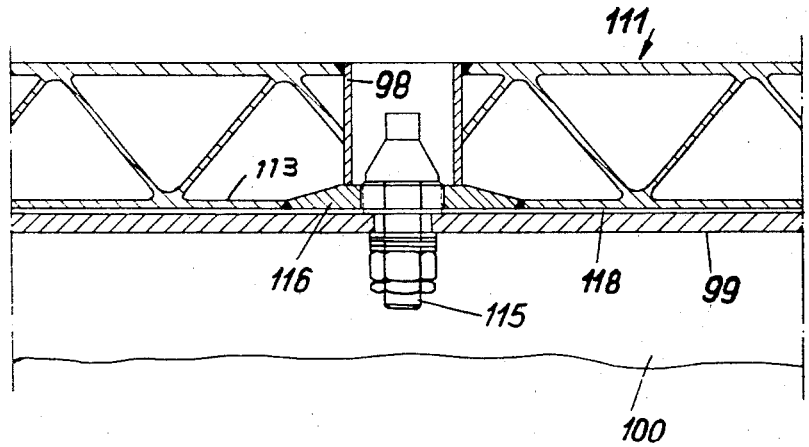
FIGURE 10 is a vertical cross-sectional view of a roadway plate taken substantially along the plane defined by reference line 10—10 in FIGURE 8.

As shown in FIGURE 8, a roadway plate 111 rests on two cross beams 100. Thus, three roadway plates 111 correspond to each pair of main girder sections, as shown in FIGURE 2. Roadway plates 111 are hollow truss plates which are provided with a truss structure 114 between two thin plates 112, 113, as shown in FIGURE 9, with hollow spaces having a triangular cross section extending across the entire length of the plate. As indicated in FIGURE 9, such a plate can be welded together from extruded aluminum sections. Conventional bolts 115 are employed for fastening plates 111 to cross beams 100. As shown in FIGURE 10, bolts 115 are passed through a thickened section 116 of the lower cover plate 113, as well as through bores in the upper terminal plate 99 of the cross beam 100. The upper part of each bolt 115 extends into an upwardly open space formed by a cylinder 98 welded into the hollow truss plate. Thus, it is possible to rotate the bolt 115 from above by means of a socket wrench, in such a manner that this bolt secures the plate 111 against being lifted off the cross beam 100. The abutting roadway plates 111 are connected with one another by horizontal pins 97 (FIGURE 22), these pins extending into bores 117 (FIGURES 8 and 22) of the respectively adjacent plate 111. As shown in FIGURE 22, the bores 117 can be provided within sockets 28 inserted in the plates 111.

The hollow truss plates 111 transfer the respective, lumped loads due to traffic from any desired location to the pedestal surfaces on the cross beams 100.

In order to attain an elastic support of the roadway plates on the cross beams, a rubber layer 118 is provided on the upper terminal plates 99 of the cross beams (see FIGURE 7).

As shown in FIGURES 3 and 4, the roadway plates 111 provided on cross beams 100 are bordered on both sides by protective curb plates composed of the sections 119, which are illustrated in detail in FIGURES 11–14.

Each curb plate section, which has the same length as a main girder section H, consists of a hollow metal beam having a rectangular profile which is open at the bottom. The side walls 120 of the curb plate section are provided, in the area of the cross beams, with trapezoidal recesses in their lower edges. Between the upper edges of these recesses, transverse plates 121 are welded between the side walls 120. By means of plates 121, each curb plate section 119 rests on four cross beams 100. The position of the curb plate section with respect to the cross beams is secured by means of connecting pins. Bores 122 are provided in the plates 120 (FIGURE 12) and bores 123 are provided in the upper terminal plates 99 of the cross beams 100 (FIGURE 5) to receive the curb plate connecting pins. The side walls 120 are angled outwardly at their lower rims in the areas between the trapezoidal recesses, so that flange-like ledges 124 are formed provided with bores 125.

Fastening members 126 are inserted in the ends of the curb plate sections 119; these members being provided with transverse bores 127 for connecting pins, by means of which adjacent curb plate sections are connected with each other.

The curb plate sections 119 can be employed for the formation of a projecting lug to assist in rolling the main girder sections during the assembly of the bridge. As illustrated in FIGURE 15, two curb plate sections 119 positioned one above the other are first fastened to the respective end of each of the two main girders 1. These curb plate sections are arranged so that their flanges 124 engage each other, i.e., so that their cross sections are in a mirror-image relationship with respect to the abutting surfaces of the flanges 124, as best shown in FIGURE 16. By means of screws 96 or bolts passed through the holes 125 of the flanges 124, the two curb plate sections are firmly connected with each other.

Two further curb plate sections 119 follow this pair of curb plate sections, at first one above the other in pairs, and then individually (with top-positioned flanges 124). The rigid connection of the successive curb plate sections with one another, as well as the rigid connection of the first pair of curb plate sections with the main girder 1, is accomplished with the aid of webs 128 attached on both sides of the side walls 120, with bolts 95 passed through the holes 127 in the fastening members 126. The webs 128 which serve for attachment to the main girder 1 each have one bore through which a bolt 129 is passed for fastening to an intermediate section 130. The latter is constructed similar to an end of a chord section 37. It is likewise provided with multi-sectional hinge halves 41 connected with the hinge halves 41 attached to the chord section 37, as well as with the base of the post 3, by means of a bolt 131. Furthermore, the intermediate section 130 and the chord section 37 are coupled to the post 3 by means of additional bolts 132.

The projecting lug formed from the curb plate sections 119 is furthermore attached to the main girder 1 by means of a strut 133; the strut 133 being joined at one end to the upper end of the post 3 by a bolt 134, and being connected at the other end through a hydraulic push and pull press 135 to a boss 136 which is mounted at the junction point between the first and the second pair of curb plate sections 119 on the upper surface of the top sections. By actuating the press 135, the projecting lug can be lifted and lowered. The two projecting lugs joined to the two main girders 1 of the bridge to be advanced by rolling are connected with each other, preferably at the junction points between the curb plate sections, by means of crossbars and additionally by diagonal bars extending thereinbetween.

The projecting lug formed in the above-described manner has along its entire length a smooth abutment surface for the advancing rollers. This surface is continued to the likewise smooth surfaces formed by the lower terminal plate of the intermediate section 130, as well as by the lower terminal plates 9 of the chord sections 37 in the lower chord of the main girder. Therefore, the support structure of the bridge can be advanced on rollers without difficulty.

Figure 18:
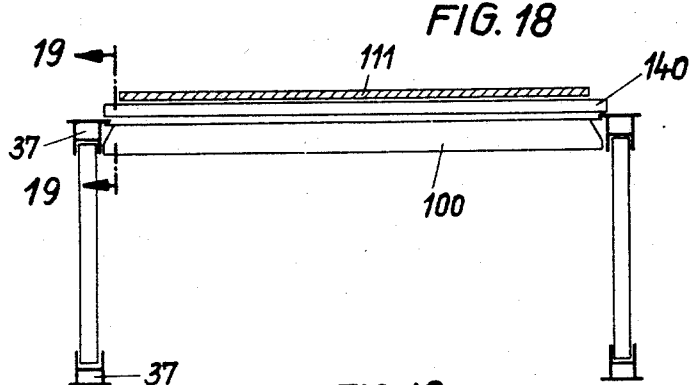
FIGURE 18 is a vertical cross-sectional view of another dismountable bridge of this invention.
Figure 19:
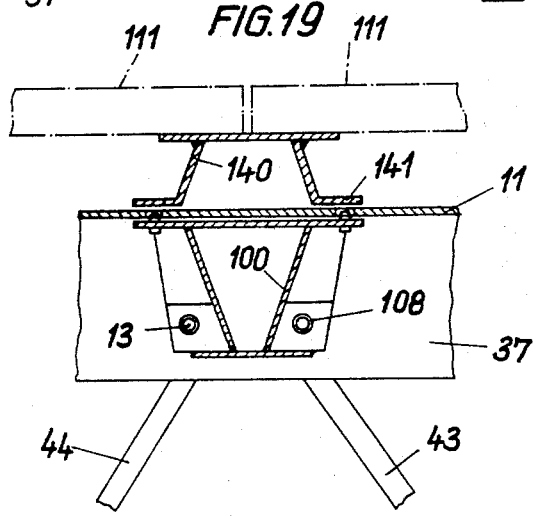
FIGURE 19 is an enlarged vertical cross-sectional view taken substantially along the plane defined by reference line 19—19 of FIGURE 18.

FIGURES 18 and 19 illustrate that it is also possible to construct deck bridges having a topside roadway with the above-described structural elements. The cross section of such a bridge, as shown in FIGURE 18, results substantially from rotating by 180° the cross section as illustrated in the left-hand portion of FIGURE 3. However, the roadway plates 111 are naturally placed above the cross beams 100 in this embodiment. In this arrangement, the roadway plates do not directly rest upon the cross beams 100, but are supported on intermediate beams 140 having a trapezoidal cross section, as shown in FIGURE 19, which beams are positioned, with horizontally angled edges 141, on the ledges 11 of the top chord sections 37 of the main girder sections so as to transfer the traffic loads thereto. The position of the intermediate beams 140 on the chord sections 37 is secured by connecting pins, which are not shown in the drawings. The roadway plates 111 are fastened onto the intermediate beams 140 in the same manner as in the truss bridge according to FIGURE 3 where the roadway plates are fastened onto the cross beams 100.

Figure 20:
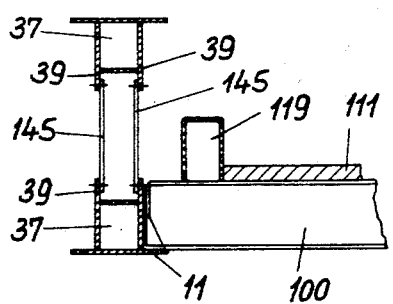
FIGURE 20 is a vertical cross-sectional view of a dismountable bridge having particularly low main girders.

FIGURE 20 illustrates how a bridge having low main girders can be assembled from the structural elements of this invention. In this embodiment, two chord sections 37 are connected at a small distance from each other, one chord section being above the other, by means of straps 145 consisting, for example, of simple metal sheets which are attached to the side walls 39 in place of the diagonal bars 43, 44. These metal sheets need not extend across the entire length of the main girders; rather, it is possible to provide metal plate sections with gaps therebetween. Such a bridge has the advantage of light weight, and furthermore the upper chord sections can easily be attached manually, so that the assembly takes only a relatively short period of time.

Such an embodiment is also preferred when the roadway plates are placed directly onto the ledges 11 of the main girder sections, i.e., without the interposition of cross beams, as shown in detail in FIGURES 21 and 22. In this embodiment, the plates 2 are considerably stronger than the plates 111 of the above-described embodiment, since the plates 2 are not supported by cross beams 100. Accordingly, the plates 2 are placed on the projecting ledges 11 of the chord sections 37 forming the lower chords of the main girders 1. Pins 12 mounted to the ledges 11 and extending upwardly engage bores in the undersides of the plates 2 from below. In the lower chord sections 37, there are again provided bolts 13 having horizontal axes extending at right angles to the direction of the bridge, these bolts being displaceable in the direction of their axes. Coupling members 14 are provided at the top corners of each plate 2. After a plate 2 is placed on the ledges 11, the bolts 13 are moved toward the plates. During this procedure, the bolts engage bores 15 in the coupling members 14 and thus prevent the plates 2 from being lifted off the ledges 11. At the same time, these bolts serve for transmitting the forces effective in the extension of the bridge between the plates 2 and the main girders 1.

From above, a bracket 17 engages, with one of its lug ends, a vertical bore 16 of each coupling member 14. The other lug end of this bracket extends from above into a bore 94 in the chord section 37. The brackets 17, in conjunction with the pins 12, prevent a main girder 1 from being pivoted about an axis extending in the bridge direction with respect to the plates 2. They ensure the required rigidity of the frame. The plates 2 accordingly transmit the forces and moments effective thereon to the main girders 1, without the use of additional longitudinal or transverse beams. Thus, they represent simultaneously roadway plates, longitudinal and transverse beams, as well as wind bracing structures.

Figure 23:
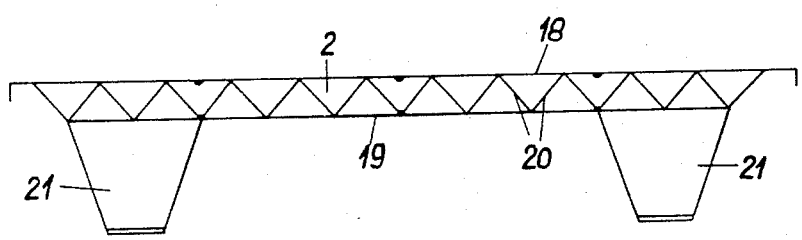
FIGURE 23 is a vertical cross-sectional view taken substantially along the plane defined by reference line 23—23 of FIGURE 21.

A plate 2, as shown in FIGURE 23, is provided with an upper cover plate 18 and, parallel to this plate, with a lower cover plate 19. The upper cover plate 18 is bent at a right angle downwardly at the longitudinal sides of the plate 2. Between the two cover plates 18, 19, V-shaped reinforcing ribs are arranged which extend in the longitudinal direction of the plate 2; these ribs being connected to the upper and lower cover plates and being formed by a stepwise-bent plate 20. On the underside of the lower cover plate 19, there are additionally connected to the longitudinal edges of the plate 2 hollow ribs 21 which are of a torsion-resistant construction, for example by having transverse partitions inserted therein. These ribs 21 are constructed as hollow boxes with a trapezoidal cross section which tapers toward the bottom, and they extend like the ribs 20 in the longitudinal direction of the plate 2. The plate 2 rests on the ledges 11 with the undersides of the hollow ribs 21. Correspondingly, the bores for receiving the pins 12 are located at the ends of the lower terminal plates of these ribs. The hollow ribs are suitably two to three times the height of the remainder of the plate, and serve the function of cross beams.

In place of the sheet 20, it is also possible, for example, to provide a corrugated metal sheet between the upper and the lower cover plates. Likewise, V-shaped ribs having a vertical central web can also serve for reinforcing the structure.

Figure 24:
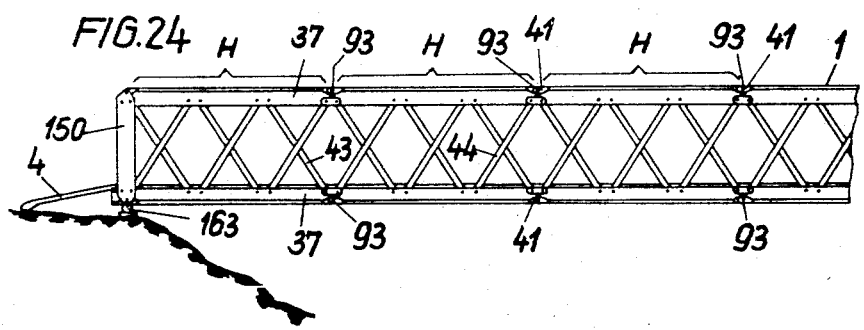
FIGURE 24 is a side view of a portion of another dismountable bridge of this invention.

In the embodiment of FIGURES 24 and 25, a one-story bridge is made from two main girders 1, cross beams 100 connected with the main girders in a bending-resistant manner, and roadway plates 111 mounted thereon. The main girders 1 comprise individual main girder sections H which, in turn, contain an upper and a lower chord section 37 and three pairs of intersecting diagonal bars 43, 44. Multi-sectional hinges 41 are provided at the ends of the chord sections 37; these hinges being connected with one another by means of connecting pins 93. Thereby, the upper chord sections 37, as well as the lower chord sections 37, are firmly connected with each other, and thus the main girder sections H are also connected with one another. The bridge shown in FIGURES 24–25 differs from the construction shown in FIGURES 4, 6, and 7 in that the position of each cross beam 100 on the projections 11 of chord sections 37 is not secured by having connecting pins 104 extending downwardly from the cross beams to engage bores of the ledges 11, but rather by having lugs 12 extending upwardly from the projections 11 pass through bores in the lower flanges of the cross beam 100. The roadway plates 111 are mounted on the cross beams 100 in the same manner as in the embodiment described above in connection with FIGURE 10. At the ends of the bridge, ramp plates 4 join the roadway plates 111. The roadway is encompassed on both sides by protective curb plates 119 fastened to the roadway plates 111, as shown in FIGURE 25.

The terminal posts 150 are of a double-T profile. They consist of two lateral plates 151 and a web plate 152. The lateral plates 151 are chamfered at their upper and lower ends and bent toward the outside, so that the spacing between the lateral plates 151 is substantially larger at the ends than in the main section of the end post. The spacing at the ends is large enough so that the multisectional hinges 41 attached to the chord sections 37 can be accommodated between these lateral plates. As illustrated in FIGURES 28, 30, 31, and 32, the lower end of each terminal post 150 is connected, on the one hand, with a chord section 37 and, on the other hand, with an intermediate section 130. The latter has the same profile as the chord section 37 and is likewise provided with multisectional hinges 41. These hinges engage between the multisectional hinges 41 of the chord section 37 and are connected with one another, as well as with the terminal post 151, by means of a connecting pin 153. Bores are provided for this latter pin in the lower, bent edges of the lateral plates 151.

The lateral walls 39 of the chord section 37 engage between the lateral plates 151 of the terminal post and abut against these plates where the spacing between the lateral plates is not yet enlarged by the bending thereof. At this point, a connecting pin 154 is passed through bores in the lateral walls 39 and the lateral plates 151 so that the chord section 37 is connected with the terminal post in a bending-resistant manner. Correspondingly, the intermediate section 130 is connected to the terminal post by means of a connecting pin 155.

The connecting pin 154 additionally serves for attaching a diagonal rod 44 having a double-T profile, the flanges of which abut the inner sides of the side walls 39 of the chord section 37.

FIGURES 31 and 32 show the connection of a cross beam 100 to the end post 150 and the chord section 37, as well as to the intermediate section 130. In order to prevent the cross beam 100 from lifting off the projections 11, a retaining element is threadedly attached to the upper surface of the cross beam 100; this retaining element being provided with two metal plates 156 extending through vertical slots 157 in the respective side plate 151 into the interior of the end post on both sides of the web sheet 152. The metal plates 156 are connected with the web sheet 152 by a pin 158.

As shown in FIGURES 27 and 29, a chord section 37 is connected to the upper end of the terminal post basically in the same manner as is the case at the lower end of the terminal post, except that in this case the end plate 9 of the chord section 37 is at the top. Likewise, a diagonal bar 43 is connected basically in the same manner to the upper end of the end post as the diagonal rod 44 is connected at the bottom.

In FIGURE 27, it is indicated by the dashed lines that at the opposite end of the bridge, one chord section 37 and a diagonal rod 44 are connected in mirror-image relationship to the parts drawn in solid lines.

In the two-story bridge according to FIGURES 26, 33, and 34, two terminal posts 150 are placed one on top of the other. In this embodiment, two main girder sections H are likewise provided one above the other. Each of these sections comprises an upper and a lower chord section 37, three pairs of crossing diagonal bars 43, 44, as well as light-weight tubes 51 connecting the ends of the diagonal rods 43, 44 with each other at the ends which are facing away from the chord sections 37 by being welded to the lower ends of these rods.

A coupling member consisting of two metal plates 159 and a vertically arranged web sheet 160 serves for connecting the superposed end posts 150 as well as the respective diagonal bars 43 and 44 with one another. The metal plates 159 are provided with bores at their four ends, which bores are in alignment with bores at the ends of the terminal posts 150 facing one another, namely those bores which receive, according to FIGURES 28, 30, 31, and 32, the connecting pins 154 and 155. In the present case, the pins 154, 155 passed through these bores do not serve for connecting chord sections or intermediate sections, but only for connecting the diagonal bars 43 and 44. The two sheet metal plates 159 are provided at such a spacing from each other that they abut, on the one hand, the inner sides of the side plates 151 of the terminal posts, namely at that point where the spacing of the side surfaces 151 is not yet widened by being bent away from each other, and encompass between them the flanges of the diagonal rods 43 and 44.

In the center of the coupling members 159, 160, two tubular sections 161 penetrate the two metal plates 159. These tubular sections are welded together with the coupling member and are of such a length that they fit into the widened space between the bent ends of the side plates 151. Connecting pins 153 are passed through the tubular sections 161 and through the bores aligned therewith in the tapering ends of the side face 151.

The coupling members 159, 160, as shown in FIGURE 26, also serve for connecting two superposed main girders H with each other.

The invention affords a simplification particularly since the end posts 150 per se are not provided with multisectional hinges, but the hinge sections 41 attached to the chord sections 37 and to the intermediate sections 130, respectively, serve for connecting the end posts to these parts; these hinge sections being accommodated in the widened spaces formed by the bending of the side plates 151.

The lower ends of the end posts 150 terminate in lugs 162 which engage in slots, in order to limit the longitudinal displacement of the bridge; these slots being provided in supporting rollers 163 (FIGURES 24 and 26) at the bridge abutments.

In FIGURE 33, it is indicated in dashed lines that diagonal bars 43 and 44—for the opposite end of the two-story bridge—can also be provided in a mirror-image relationship to the diagonal bars 43, 44 illustrated in solid lines.

FIGURE 33 shows furthermore that the web sheet 160 is somewhat bent at the top and at the bottom, so that it can be accommodated beside the webs 152 of the two terminal posts. The sheet metal plates 159 are provided with slots 163 at the top and at the bottom, which slots are engaged by the web sheets 152 of the end posts.

It will be understood that the above description of the present invention is suscepible to various modifications, changes, and adaptations, and the same are intended to be comprehended within the meaning and range of equivalents of the appended claims.

I claim:

1. A dismountable structural unit for use in the fabrication of dismountable bridges or the like, comprising, in combination:
   (a) two main girders each containing upper and lower chord members, the lower chord members of both main girders having ledges projecting therefrom each said main girder being composed of a plurality of identical main girder sections, a plurality of multisectional hinges attached to said sections and coupling said sections together at the ends of their chord members, and a plurality of connecting pins positioned at right angles to said main girders and connecting adjacent pairs of said multisectional hinges together, whereby said hinges distribute bending moments resulting from the inherent weight of the components of said unit and from traffic supported thereby across several main girder sections;
   (b) a plurality of roadway supporting elements extending between the lower chord members of said main girders and resting on the ledges projecting therefrom; and
   (c) means for detachably connecting said roadway supporting elements to the lower chord members of said main girders.

2. A structural unit as defined in claim 1 wherein said multisectional hinges are connected to the chords of the main girder sections in such a manner that the undersides of the lower chords and the topsides of the upper chords are not interrupted at the junction points of the main girder sections.

3. A structural unit as defined in claim 1 wherein the upper and lower chord members of said main girders are connected together by relatively short spacing members.

4. A structural unit as defined in claim 1 wherein said roadway supporting elements comprise box-shaped cross beams which are resistant to bending and torsional stresses, said cross beams serving as a seat for roadway plates, the ends of said cross beams having flanges for resting on the projecting ledges of said lower chord members, and means for connecting said flanges to the projecting ledges of said lower chord members.

5. A structural unit as defined in claim 4 wherein each cross beam has a trapezoidal cross section which tapers toward the top, and a plate which covers the top of said beam and projects on both sides at right angles thereto.

6. A structural unit as defined in claim 1 in which said main girders are connected between terminal posts each of which comprises a pair of side plates which extend in the longitudinal direction of said bridge and a web plate connecting the side plates, the side plates being spread at their upper and lower ends by bending to receive the multisectional hinges of the adjacent chord members, each terminal post being connected with an upper and lower chord member by means of a first connecting pin passed through bores in the spread portions of said side plates and through the multisectional hinges therewithin and by a second connecting pin passed through bores in the side walls of the chord members and matching bores in the side plates of said terminal posts in the portions thereof which are not spread.

7. A structural unit as defined in claim 6 wherein two terminal posts are coupled together in end-to-end relation by means of two coupling plates extending between the straight portions of said side plates and connected thereto by means of coupling pins, and two tubes extending through the coupling plates between the spread portion of said side plates for receiving two additional coupling pins.

8. A structural unit as defined in claim 6 and further comprising means attached to the roadway supporting elements and extending through slots in one side plate of said terminal post for detachable connection to the web plate thereof to prevent the roadway supporting elements from being lifted off the projecting ledges of said lower chord members.

9. A dismountable structural unit for use in the fabrication of dismountable bridges or the like, comprising, in combination:
 (a) two main girders each containing upper and lower chord members, the lower chord members of both main girders having ledges projecting therefrom, each said chord member being composed of a hollow metal beam having two side walls and two terminal plates extending therebetween, one said terminal plate thereof forming said projecting ledges while the other terminal plate thereof is positioned between said two side walls and angled toward the other terminal plate at spaced points along said beam to receive truss bars;
 (b) a plurality of roadway supporting elements extending between the lower chord members of said main girders and resting on the ledges projecting therefrom; and
 (c) means for detachably connecting said roadway supporting elements to the lower chord members of said main girders.

10. A dismountable structural unit for use in the fabrication of dismountable bridges or the like, comprising, in combination:
 (a) two main girders each containing upper and lower chord members, the lower chord members of both main girders having ledges projecting therefrom;
 (b) a plurality of roadway supporting elements extending between the lower chord members of said main girders and resting on the ledges projecting therefrom, said roadway supporting elements being composed of box-shaped cross beams which are resistant to bending and torsional stresses, said cross beams serving as a seat for roadway plates, the ends of said cross beams having flanges for resting on the projecting ledges of said lower chord members, and means for connecting said flanges to the projecting ledges of said lower chord members;
 (c) means for detachably connecting said roadway supporting elements to the lower chord members of said main girders;
 (d) box-shaped protective curb plate sections resting on both sides of such roadway plates, the walls of said curb plate sections extending downwardly between said cross beams and being angled outwardly at their lower edges to form flanges.

11. A structural unit as defined in claim 10 and further comprising a projecting lug attached to one end of said main girders, said projecting lug comprising two curb plate members connected in mirror image relationship with each other by means of bolts passed through the flanges thereof.

12. A structural unit as defined in claim 11 wherein said projecting lug is connected to the main girders by means of struts and interposed hydraulic adjusting devices.

13. A dismountable structural unit for use in the fabrication of dismountable bridges or the like, comprising, in combination:
 (a) two main girders each containing upper and lower chord members, the lower chord members of both main girders having ledges projecting therefrom;
 (b) a plurality of roadway supporting elements extending between the lower chord members of said main girders and resting on the ledges projecting therefrom, said supporting elements being composed of box-shaped cross beams which are resistant to bending and torsional stresses, said cross beams serving as a seat for roadway plates, the ends of said cross beams having flanges for resting on the projecting ledges of said lower chord members, each said cross beam having a trapezoidal cross section which tapers toward the top, and a plate which covers the top of said beam and projects on both sides at right angles thereto, said supporting element further including means for connecting said flanges to the projecting ledges of said lower chord members;
 (c) means for detachably connecting said roadway supporting elements to the lower chord members of said main girders; and
 (d) end straps on the ends of said cross beams, said end straps being angled toward the inside at their lower sections to form recesses for receiving connecting pins.

14. A dismountable structural unit for use in the fabrication of dismountable bridges or the like, comprising, in combination:
 (a) two main girders each containing upper and lower chord members, the lower chord members of both main girders having ledges projecting therefrom;
 (b) a plurality of roadway supporting elements extending between the lower chord members of said main girders and resting on the ledges projecting therefrom, said roadway supporting elements being composed of box-shaped cross beams which are resistant to bending and torsional stresses, said cross beams serving as a seat for roadway plates, the ends of said cross beams having flanges for resting on the projecting ledges of said lower chord members, said roadway supporting elements further including means for connecting said flanges to the projecting ledges of said lower chord members;
 (c) means for detachably connecting said roadway supporting elements to the lower chord members of said main girders; and
 (d) a layer of resilient material on the upper surface of said cross beams for resiliently supporting such roadway plates.

15. A dismountable structural unit for use in the fabrication of dismountable bridges or the like, comprising, in combination:
 (a) two main girders each containing upper and lower chord members, the lower chord members of both main girders having ledges projecting therefrom;
 (b) a plurality of roadway supporting elements extending between the lower chord members of said main girders and resting on the ledges projecting therefrom, said roadway supporting elements being composed of box-shaped cross beams which are resistant to bending and torsional stresses, said cross beams serving as a seat for roadway plates, the ends of said cross beams having flanges for resting on the projecting ledges of said lower chord members, and means for connecting said flanges to the projecting ledges of said lower chord members;
 (c) means for detachably connecting said roadway supporting elements to the lower chord members of said main girders; and
 (d) roadway plates seated on said cross beams and composed of hollow, truss plates having recessed openings therethrough for receiving fastening means for fastening said plates to said cross beams.

16. A dismountable structural unit for use in the fabrication of dismountable bridges or the like, comprising, in combination:
 (a) two main girders each containing upper and lower chord members, the chord members of both main girders having ledges projecting therefrom;

(b) a plurality of roadway supporting elements extending between the lower chord members of said main girders and resting on the ledges projecting therefrom, said roadway supporting elements being composed of box-shaped cross beams which are resistant to bending and torsional stresses, said cross beams serving as a seat for roadway plates, the ends of said cross beams having flanges for resting on the projecting ledges of said lower chord members, and means for connecting said flanges to the projecting ledges of said lower chord members, said cross beams abutting against the underside of said ledges projecting from said upper chord members;

(c) means for detachably connecting said roadway supporting elements to the lower chord members of said main girders; and (d) roadway plates mounted on intermediate beams which rest on the upper chord members of said main girders.

17. A dismountable structural unit for use in the fabrication of dismountable bridges or the like, comprising, in combination:

(a) two main girders each containing upper and lower chord members, the lower chord members of both main girders having ledges projecting therefrom;

(b) a plurality of roadway supporting elements extending between the lower chord members of said main girders and resting on the ledges projecting therefrom, said roadway supporting elements being composed of roadway plates which are resistant to bending and torsional stresses, each of said supporting elements being further composed of an upper cover plate, a lower cover plate, and a truss structure extending between said upper and lower cover plates, said roadway supporting elements resting on the top of hollow trapezoidal ribs which have a cross section that flares toward the top, and said hollow trapezoidal ribs being from two to three times as high as the distance between said cover plates; and (c) means for detachably connecting said roadway supporting elements to the lower chord members of said main girders.

18. A set of structural elements for use in the fabrication of dismountable bridges or the like, said set comprising:

(a) a plurality of identical longitudinal chord members each having a longitudinal ledge projecting therefrom for receiving and supporting load bearing members disposed at right angles thereto, and means on each side of said longitudinal chord members for detachably attaching said load bearing members thereto;

(b) a plurality of identical load bearing members each having means on both ends thereof for being detachably attached between a pair of longitudinal supporting members disposed at right angles thereto; and (c) a multisectional hinge half attached to each end of each of said longitudinal chord members, said multisectional hinge halves being dimensioned to mesh with each other and to be connected together by a hinge pin extending therethrough at right angles to the longitudinal dimension of said longitudinal chord members.

19. A set of structural elements as defined in claim 18 wherein said longitudinal chord members comprise hollow beams having a generally H-shaped cross-sectional configuration with a cap member attached to one half of said H shape and extending from both sides thereof to form said projecting longitudinal ledges, said multisectional hinges being attached to the ends of said cap members in alignment therewith.

20. A set of structural elements as defined in claim 19 wherein said means for detachably attaching said load bearing members to said longitudinal support members comprises a series of bores in the projecting ledges of said longitudinal chord members for receiving pin members, and downwardly directed pin member projecting from each end of each load bearing member for engagement in said bores.

21. A set of structural elements for use in the fabrication of dismountable bridges or the like, said set comprising:

(a) a plurality of identical longitudinal chord members each having a longitudinal ledge projecting therefrom for receiving and supporting load bearing members disposed at right angles thereto, and means on each of said longitudinal chord members for detachably attaching said load bearing members thereto, said longitudinal chord members being composed of hollow beams having a generally H-shaped cross-sectional configuration with a cap member attached to one-half of said H shape and extending from both sides thereof to form said projecting longitudinal ledge; and (b) a plurality of identical load bearing members each having means on both ends thereof for being detachably attached between a pair of longitudinal support members disposed at right angles thereto.

22. A set of structural elements as defined in claim 21 wherein said load bearing members are hollow beams having a generally trapezoidally shaped cross-sectional configuration which tapers toward the top and a top plate which projects on both sides of said trapezoidally shaped cross-sectional configuration at right angles thereto.

23. A set of structural elements as defined in claim 22 wherein said means for detachably attaching said load bearing members to said longitudinal support members comprises a series of bores in the projecting ledges of said longitudinal chord members for receiving pin members, and downwardly directed pin member projecting from each end of each load bearing member for engagement in said bores.

References Cited

UNITED STATES PATENTS

| | | | |
|---|---|---|---|
| 60,205 | 12/1866 | Leopold | 14—17 |
| 527,430 | 10/1894 | Knights | 14—73 |
| 737,679 | 9/1903 | Waddell et al. | 14—3 |
| 1,474,513 | 11/1923 | Drake | 14—73 X |
| 2,024,001 | 12/1935 | Hamilton | 14—14 |
| 3,121,894 | 2/1964 | Cheng | 14—13 |
| 3,160,900 | 12/1964 | Sedlacek et al. | 14—17 X |

NILE C. BYERS, JR., *Primary Examiner.*

U.S. Cl. X.R.

52—495